(12) United States Patent
Kato et al.

(10) Patent No.: US 7,111,258 B2
(45) Date of Patent: Sep. 19, 2006

(54) METHOD FOR DESIGNING LOGIC CIRCUIT AND CAD PROGRAM

(75) Inventors: Naoki Kato, Kodaira (JP); Kazuo Yano, Hino (JP)

(73) Assignee: Hitachi, Ltd., Tokyo (JP)

(*) Notice: Subject to any disclaimer, the term of this patent is extended or adjusted under 35 U.S.C. 154(b) by 296 days.

(21) Appl. No.: 10/609,540

(22) Filed: Jul. 1, 2003

(65) Prior Publication Data
US 2004/0088674 A1 May 6, 2004

(30) Foreign Application Priority Data
Oct. 31, 2002 (JP) ............................ P2002-316981

(51) Int. Cl.
*G06F 17/50* (2006.01)
(52) U.S. Cl. ............................ 716/4; 716/5
(58) Field of Classification Search ............... 716/1–6, 716/18
See application file for complete search history.

(56) References Cited
U.S. PATENT DOCUMENTS
6,477,683 B1* 11/2002 Killian et al. ................. 716/1
6,609,244 B1* 8/2003 Kato et al. .................... 716/18
2002/0138244 A1* 9/2002 Meyer .......................... 703/14
2003/0200511 A1* 10/2003 Nakajima ...................... 716/1

* cited by examiner

*Primary Examiner*—Vuthe Siek
*Assistant Examiner*—Binh Tat
(74) *Attorney, Agent, or Firm*—Miles & Stockbridge P.C.

(57) ABSTRACT

A method for designing a logic circuit and a CAD program which allow a logic circuit with desired performance to be designed in a short period of time by suppressing the elongation of a logic design period for achieving a circuit area, an operating speed, power consumption, and the like as target specifications are provided at low cost. Shorter-period and lower-cost design is accomplished by allowing a user to use a high-performance logic synthesis CAD program at no charge if he only checks circuit characteristics resulting from synthesis and collecting a fee if the user is satisfied with the resulting circuit characteristics and intends to use a gate level logic circuit. In a design phase which receives a register transfer level or operation level logic circuit and synthesizes a gate level logic circuit, desired circuit characteristics are obtainable in a short period of time at low cost.

12 Claims, 6 Drawing Sheets

FIG. 6

CUSTOMER INFORMATION

| CUSTOMER NAME | DEPARTMENT NAME | THE REMAINING AMOUNT OF MONEY |
|---|---|---|
| A COMPANY | B DESIGN DEPARTMENT | ¥2,000,000 |

DESIGNER INFORMATION

| USER ID | PASSWORD |
|---|---|
| tanaka | **** |
| .... | .... |

CHARGE LOG

| DATE | THE AMOUNT OF MONEY |
|---|---|
| .... | .... |
| .... | .... |

USE LOG

| DATE | GATE SIZE | THE AMOUNT OF MONEY | USER |
|---|---|---|---|
| 2001.01.01 | 10kG | ¥10,000 | yamada |
| .... | .... | .... | .... |
| .... | .... | .... | .... |
| .... | .... | .... | .... |

DISCOUNT RATE

| |
|---|
| 20% |

CUSTOMER MANAGEMENT DATABASE 61

METHOD FOR DESIGNING LOGIC CIRCUIT AND CAD PROGRAM

BACKGROUND OF THE INVENTION

1. Field of the Invention

The present invention relates to a method for designing a logic circuit and, more particularly, to a method for designing a high-performance logic circuit in a short period of time.

2. Description of Related Art

In the current design of a logic circuit, a method in which a logic function is described at a register transfer level or an operation level in a logic description language termed an HDL (Hardware Description Language) and the logic described at the register transfer level or the operation level is converted to gate level logic by using a CAD tool for logic synthesis is used most prevalently. The register transfer level explicitly describes required registers and arithmetic units in conjunction with data paths and control paths for providing connection between the registers and the arithmetic units. At present, the register transfer level is a description level used most frequently for a logic circuit in the design thereof. The operation level is a description level higher in the degree of abstractness than the register transfer level. The operation level describes a control structure, similarly to a software language, and does not explicitly describe registers and arithmetic units as circuit elements. The operation level is also termed an algorithm level or a behavior level.

In general, circuit components termed cells have primitive logic functions such as AND logic and OR logic and are designed preliminarily. A CAD tool for logic synthesis stores the respective characteristics of the individual cells including logic function, layout size, delay, and power consumption in the library thereof. By converting a logic function described at the register transfer level or the operation level to a logic function such as AND, OR, or NOT and allocating the cells in the library to the logic function, a logic circuit described in the connectional relation of the cells, i.e., a gate level logic circuit can be obtained from the logic function described at the register transfer level or the operation level. The gate level logic circuit is passed to a layout step as the subsequent design process.

In the foregoing logic synthesis process, synthesis constrains are placed on the allocation of the cells in the library. The first synthesis constraint is the target values of the design specifications of a logic circuit including circuit area, operating speed, and power consumption. The structure of the logic circuit should be determined to satisfy the specifications. The second synthesis constraint is conditions external to the logic circuit, which include the load capacitance of a cell for driving the input port of a logic circuit for which logic synthesis is performed, the load capacitances of a wire and a cell connected to the output port of the logic circuit, the time at which a signal reaches the input port, and a time required by the signal from the output port to reach an external flip flop. The third synthesis constraint is the wiring load of the logic circuit that has been laid out. For example, a wiring load assumed based on a virtual wiring load model is given as a load capacitance on a per fan-out basis.

Thus, the logic synthesis process is provided with the logic circuit described in an HDL, the synthesis constraints, and the cell library, performs the steps of optimizing a logic structure and allocating cells, and outputs the gate level logic circuit of the logic circuit. The primary object of the design of a logic circuit at the register transfer level or the operation level is normally the implementation of a target logic function so that, in most cases, sufficient consideration is not given to the physical characteristics of the logic circuit when it is implemented as an actual semiconductor device such as circuit area, operating speed, and power consumption. Accordingly, the correction of an HDL description, logic synthesis, and the evaluation of the circuit area, operating speed, power consumption, and the like of a gate level logic circuit obtained as a result of logic synthesis are repeated several times so that the target specifications are approached.

Even when the design starts from the same HDL description, the gate level logic circuit and the characteristic thereof differ if different CAD tools are used for logic synthesis.

With the remarkable progress of digital information equipment represented by a personal computer, the performance required of a semiconductor chip forming the heart of the digital information equipment has been improved rapidly year after year. The operation frequency is exceeding 1 GHz, while lower power consumption is stringently required of a semiconductor chip used in a battery-powered mobile information device, such as a mobile phone, for a longer battery life. The design of a logic circuit should be performed to satisfy these stringent requirements. This causes the problem that, even if a design period is reduced by distributing design resources and increasing the degree of abstractness of a logic description level, the design period of the logic synthesis process for achieving desired performance is increased and the total design period of a whole semiconductor chip cannot sufficiently be reduced. The following is a typical example. To provide a semiconductor chip with a target operation frequency, it is necessary for delay in each of signal paths in a logic circuit to fall within a target cycle so that, even if only one signal path falling outside the target cycle exists, the target frequency is not achievable. Accordingly, the delay design of a logic circuit requires a longest design period in the logic synthesis process.

To reduce such a design operation, numerous CAD tools for logic synthesis equipped with advanced function and performance have been on sale. Since the process performed by CAD for logic synthesis is used to solve a so-called combinational optimization problem by searching for an optimal solution closer to a design objective among numerous candidate solutions, it is impossible to select the best one by evaluating all solutions in a practical time. Each of the CAD tools for logic synthesis has been developed by improving an algorithm and thereby enhancing the ability to search for an optimal solution. This frequently causes the situation in which a CAD tool A generates a better circuit with design data A, while a CAD tool B allows the generation of a circuit higher in performance with design data B. Therefore, it is costly and unpractical for one design site to purchase a variety of CAD tools for synthesis.

In recent years, a new form of business service termed an application service provider has been offered in various software fields. This form of business service allows each company to access the server of a provider who provides software by using the Internet, use software through a network only when necessary, and pay a fee charged for the use by saving the conventional practice to purchase a required number of software items and operate and manage them on its own.

If this form of business service is used for the design of a logic circuit, however, design data which requires security protection is transferred by input/output operations through the network so that a problem associated with the security protection of design data is encountered. Another problem is encountered that large-sized input/output data increases cost and time for communication and therefore this form of business service is not compatible with promptly or repeatedly performed design. Still another problem is encountered that, if circuit characteristics obtained by using software at the cost of a service charge are unsatisfactory, the service charge is wasted for nothing. If the correction of an HDL description, logic synthesis, and the evaluation of the area, operating speed, power consumption, and the like of a gate level logic circuit obtained as a result of logic synthesis are repeated such that target specifications are approached, in particular, the use of software is charged frequently in the process of trial and error. This causes the problem that a tremendous service fee is charged by the time the target specifications are obtained.

SUMMARY OF THE INVENTION

In view of the foregoing problems, it is therefore an object of the present invention to provide a method for designing a logic circuit and a CAD program which ensure security protection without making advanced security provisions. Another object of the present invention is to provide a method for designing a logic circuit and a CAD program which are also compatible with promptly or repeatedly performed design. Still another object of the present invention is to provide, at low cost, a method for designing a logic circuit and a CAD program which allow a logic circuit with desired performance to be designed in a short period of time by suppressing the elongation of a logic design period for achieving circuit area, operating speed, power consumption, and the like as target specifications.

The present invention allows desired circuit characteristics to be obtained in a short period of time at low cost in a design phase which receives a register transfer level or operation level logic circuit and synthesize a gate level logic circuit.

The following is the briefly described summary of the typical aspects of the invention disclosed by the present application.

Specifically, a logic synthesis CAD program according to the present invention comprises: a first sub program for receiving a register transfer level or operation level logic circuit and generating a gate level logic circuit; a second sub program for outputting a circuit characteristic report on the generated gate level logic circuit; a third sub program for encrypting the generated gate level logic circuit and outputting the encrypted gate level logic circuit; a fourth sub program for outputting a first encryption key corresponding to the generated gate level logic circuit; and a fifth sub program for receiving a second encryption key generated based on the first encryption key, decrypting the encrypted gate level logic circuit, and outputting the gate level logic circuit.

A method for designing a logic circuit according to the present invention comprises the steps of: describing a register transfer level or operation level logic circuit through transmission and reception of information between a design site and a logic synthesis CAD program provider site; and generating a gate level logic circuit by using a logic synthesis CAD program, the logic synthesis CAD program performing the functions of: receiving the register transfer level or operation level logic circuit and generating the gate level logic circuit; outputting a characteristic of the generated gate level logic circuit as a report; encrypting the generated gate level logic circuit and outputting the encrypted gate level logic circuit; outputting a first encryption key corresponding to the gate level logic circuit; and receiving the encrypted gate level logic circuit and a second encryption key generated from the first encryption key, decrypting the encrypted gate level logic circuit, and outputting the gate level logic circuit, the design site receiving the logic synthesis CAD program at no charge from the logic synthesis CAD program provider site, referring to the circuit characteristic report on a logic circuit which is obtainable at the design site by receiving the register transfer level or operation level logic circuit and using the logic synthesis CAD program, and sending, if the circuit characteristic is as desired, the first encryption key to the logic synthesis CAD program provider site, the logic synthesis CAD program provider site generating a fee charged for the use of the logic synthesis CAD program by the design site based on the first encryption key sent from the designer site and sending, to the design site, the second encryption key obtained by processing the first encryption key, the design site receiving the encrypted gate level logic circuit and the second encryption key and decrypting the encrypted gate level logic circuit by using the logic synthesis CAD program.

Although the gate level logic circuit as the final output is encrypted and then outputted to the design site such that it is not used thereby, the circuit characteristics thereof can be used any number of times for a trial and error process which executes the CAD program to provide results since they are freely available. In that case, fees charged for the uses do not occur so that design cost at the design site is suppressed. If the design site is satisfied with a report on the circuit characteristics and intends to acquire the gate level logic circuit, it sends the first encryption key to the CAD program provider site. The first encryption has been processed such that the gate level logic circuit is not decrypted by using the unprocessed first encryption key. The CAD program provider site processes the first encryption key to generate a second encryption key with which the gate level logic circuit can be decrypted. The second encryption key is sent from the CAD program provider site to the design site. This makes it possible for the design site to decrypt the gate level logic circuit and use the decrypted gate level logic circuit for design. Although the logic synthesis CAD program is distributed at no charge, a fee charged for the use of the logic synthesis CAD program occurs when the second encryption key is sent. This allows the CAD program provider site to obtain the fee charged for the use of the program.

Since each of the first and second encryption key contains design data and information intrinsic to the design site, they are usable only for the decryption of specified design data or decryption at the specified design site so that the risk of improper use is circumvented. It is also possible to provide connection between the design site and the CAD program provider site via a network and promote the foregoing procedure via the network. The transmission and reception of the encryption keys via the network allows prompt design. Since actual design data is not transferred, advanced security provisions are unnecessary. If the CAD program provider site precharges a fee for the use of the program in advance, the fee need not be paid every time the encryption key is acquired. In that case, the design site can check the remaining amount of money so that it is additionally charged as necessary.

BRIEF DESCRIPTION OF THE DRAWINGS

FIG. 6 is a view showing a customer management database.

DETAILED DESCRIPTION OF THE PREFERRED EMBODIMENTS

Figure 1:
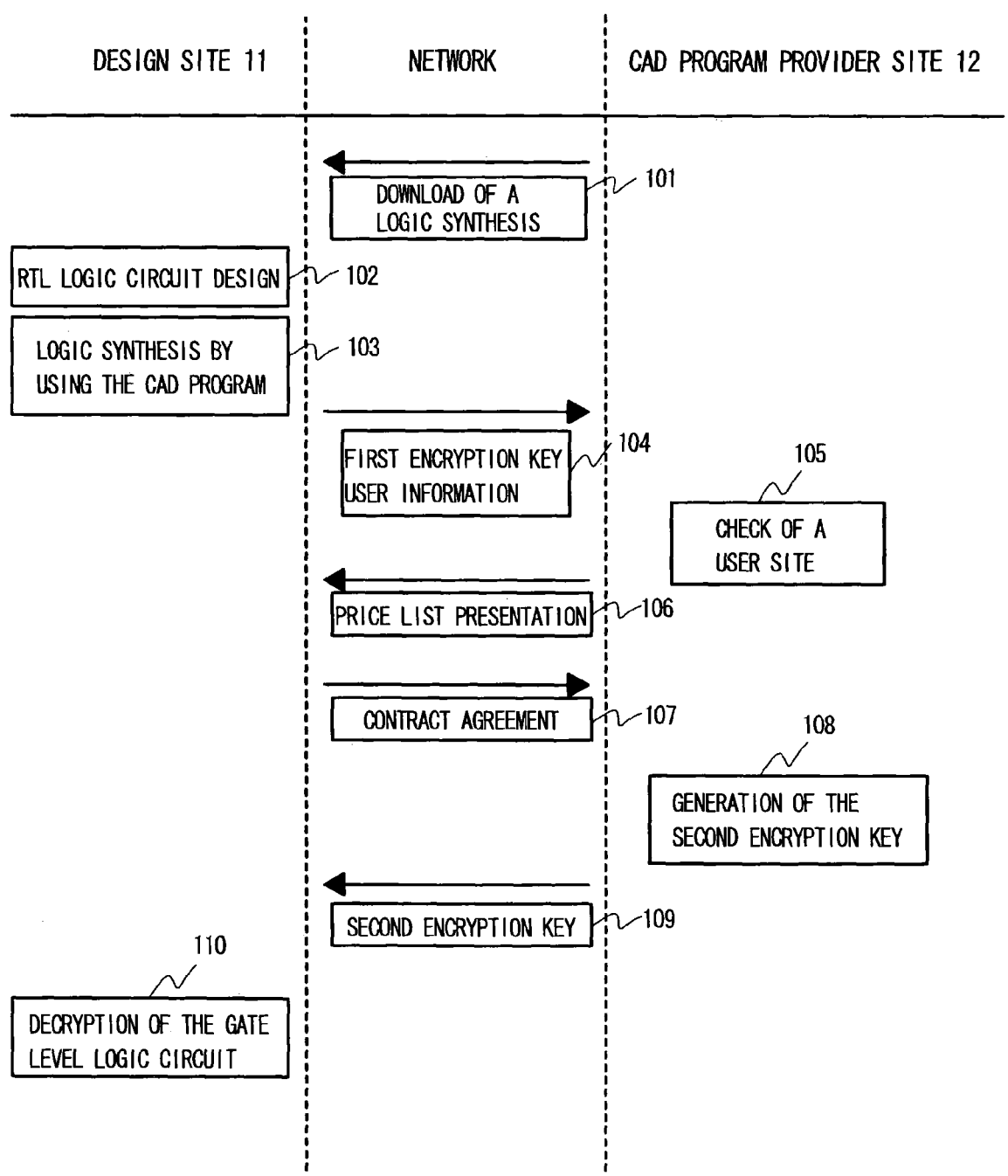
FIG. 1 is a view showing a process in accordance with a method for designing a logic circuit and the flow of information.

Referring to the drawings, an embodiment of the present invention will be described herein below.

FIG. 1 shows the embodiment of a design method according to the present invention. In an example shown in the drawing, a network provides connection between a design site 11 and a CAD program provider site 12 so that design is performed through the network. In the drawing, the box underlying the design site, the box underlying the CAD program provider site, and the box underlying the network represent a process performed at the design site, a process performed at the CAD program provider site, and information transmitted by communication performed via the network, respectively. First, the design site acquires a CAD program at no charge by downloading it from the CAD program provider site (101). It will be understood that this communication is unnecessary if the design site has already acquired the CAD program. The CAD program may also be acquired by means other than downloading such as an optical medium and a magnetic medium. The register transfer level design of a logic circuit is performed at the design site (102). Then, logic synthesis is performed by using the CAD program for logic synthesis and it is checked whether or not desired circuit characteristics (circuit area, operating speed, power consumption, and the like) are obtainable (103). Although the drawing shows each of the steps 102 and 103 only once, the steps may also be performed several times if the desired circuit characteristics are not obtainable at a time. Even if the CAD program is used several times, however, it is unnecessary to pay the service charge if only the circuit characteristics obtained as a result of logic synthesis performed by using the CAD program are checked. Since the gate level logic circuit resulting from logic synthesis is encrypted and then outputted, the CAD program cannot be used as it is for design. If the design site checks the resulting circuit characteristics and are satisfied therewith, it sends a first encryption key outputted from the CAD program and user information on the design site (104). The user information is for the identification of the design site by the CAD program provider site. It is also possible to use a method of preliminarily registering a user ID or a password. The CAD program provider site identifies the user and calculates a fee (105). The fee may be determined uniquely for each of the users or may be predetermined individually from one design site to another based on the previous contract between each of the design sites and the CAD program provider site. It is also possible to make the setting of a discount or the like based on the previous use log or determine a fee commensurate with the size of design data by embedding, in the first key, information on the size of the design data. After the calculation of the fee, the fee is presented to the design site for the final consensus confirmation (106). If the design site is satisfied with the fee, an agreement is transmitted (107). On receiving the agreement, the CAD program provider site creates a second encryption key from the first encryption key and updates the database of the use log of the user (108) and further transmits the created second encryption key to the design site (109). The design site acquires a gate level logic circuit by decompressing the encrypted gate level logic circuit by using the received second encryption key and the CAD program (110). By using the gate level, the design site performs a downstream design process including layout. Although the payment of the fee is not depicted in the drawing, it is also possible to make an electronic payment simultaneously with the transmission of the second encryption key or store the use log and charge the service fee after a given period of time such that it is paid collectively and simultaneously.

Figure 2:
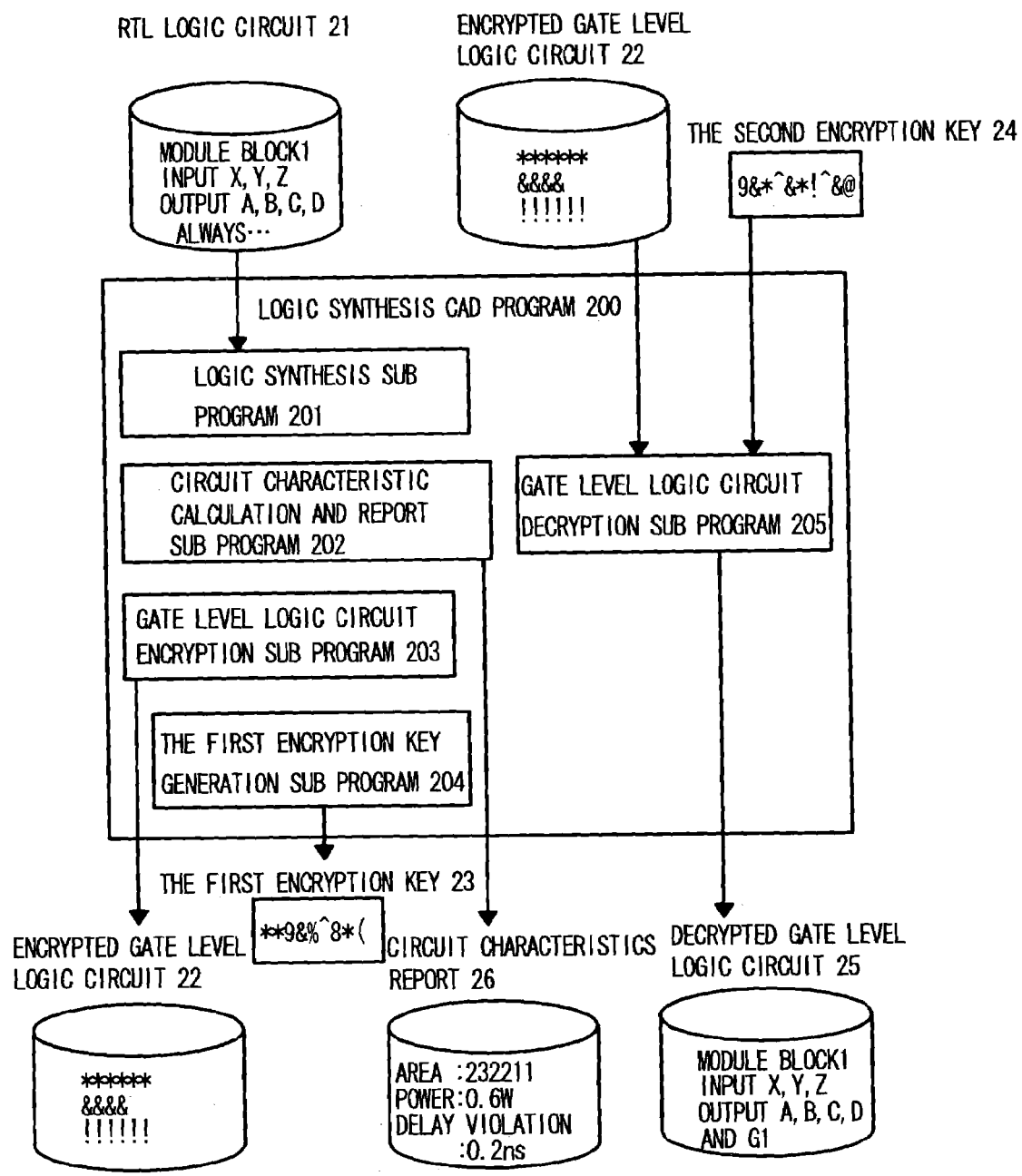
FIG. 2 is a view showing the configuration of a logic synthesis CAD program.

FIG. 2 shows the configuration of a logic synthesis CAD program according to the present invention. A logic synthesis CAD program 201 according to the present embodiment is constituted by: a logic synthesis sub program 201; a circuit characteristic calculation and report sub program 202 for calculating the characteristics of a gate level logic circuit and outputting them as a report; a gate level logic circuit encryption sub program for encrypting the generated gate level logic circuit and outputting the encrypted gate level logic circuit; a first encryption key creation sub program 204 for outputting the first encryption key required to decrypt the encrypted gate level logic circuit; and a gate level logic circuit decryption sub program 205 for receiving the second encryption key required to decrypt the encrypted gate level logic circuit, decrypting the encrypted gate level logic circuit, and outputting the decrypted gate level logic circuit. The present embodiment receives a register transfer level logic circuit 21 and outputs an encrypted gate level logic circuit 22, the first encryption key 23, and a circuit characteristic report 26. A library and design constraints required for logic synthesis are not depicted in the drawing. The present embodiment also receives the encrypted gate level logic circuit and the second encryption key 24 and outputs a gate level logic circuit 25 that has been decrypted in accordance with the gate logic circuit decryption sub program. The characteristic calculation and report sub program has the function of calculating circuit characteristics including the area, operation frequency, power consumption, and the like of a circuit and outputting the circuit characteristics. For example, the operation frequency can be implemented by using a static timing tool which is a well known technique. The power consumption can also be analyzed by using a static power analysis tool or by simulation using bench mark data.

Figure 3:
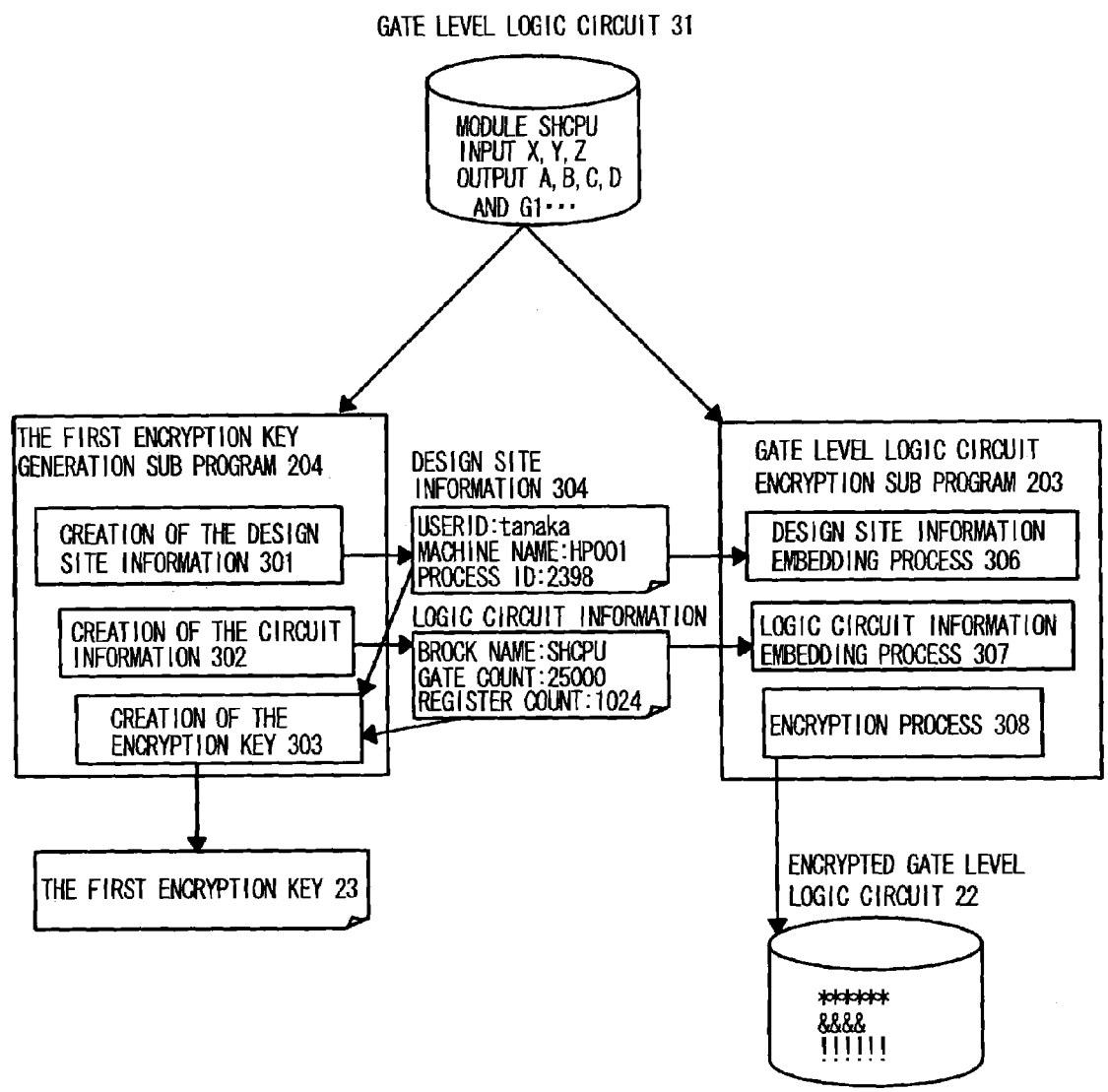
FIG. 3 is a view showing the process of encrypting a gate level logic circuit and creating a first encryption key.

Referring to FIG. 3, the process of encrypting the gate level logic circuit and creating the first encryption key in the embodiment of the present invention will be described. The first encryption key creation sub program 204 receives a gate level logic circuit 31 resulting from logic synthesis and creates design site information 304 by a design site information creation process 301. In the present embodiment, the name of a user that has executed the CAD program, an execution machine name, and a process ID have been created as design site information. Logic circuit characteristic information 305 is created by a logic circuit information creation process 302. In the present embodiment, the logic circuit characteristic information includes block name, gate size, and register count. In the key creation process, the first encryption key 23 in which the design site information and the logic circuit information have been embedded is created. The gate level logic circuit encryption sub program 203 encrypts, by an encryption process 308, the gate level logic circuit having additional information given by a design site information embedding process 306 and a logic circuit information embedding process 307 which embed, in the gate level logic circuit, the design site information and logic circuit information created by the first encryption key creation sub program and creates the encrypted gate level logic circuit 22. The reason for embedding the design site information and the logic circuit characteristic information in the first encryption key and the encrypted gate level logic circuit is that the encryption key used for decryption is usable only at the specified design site and for the specified logic circuit. It is also possible to change the type of information to be embedded in the logic circuit on each encryption. It will easily be appreciated that the encrypted gate level logic circuit cannot be decrypted by using the first encryption key for the prevention of limitless acquisition of the gate level logic circuit by the design site. The second encryption key required for decryption cannot be created at the design site. It is assumed that only the logic synthesis CAD program provider site is allowed to create the second encryption key required for decryption by further processing the first encryption key.

Figure 4:
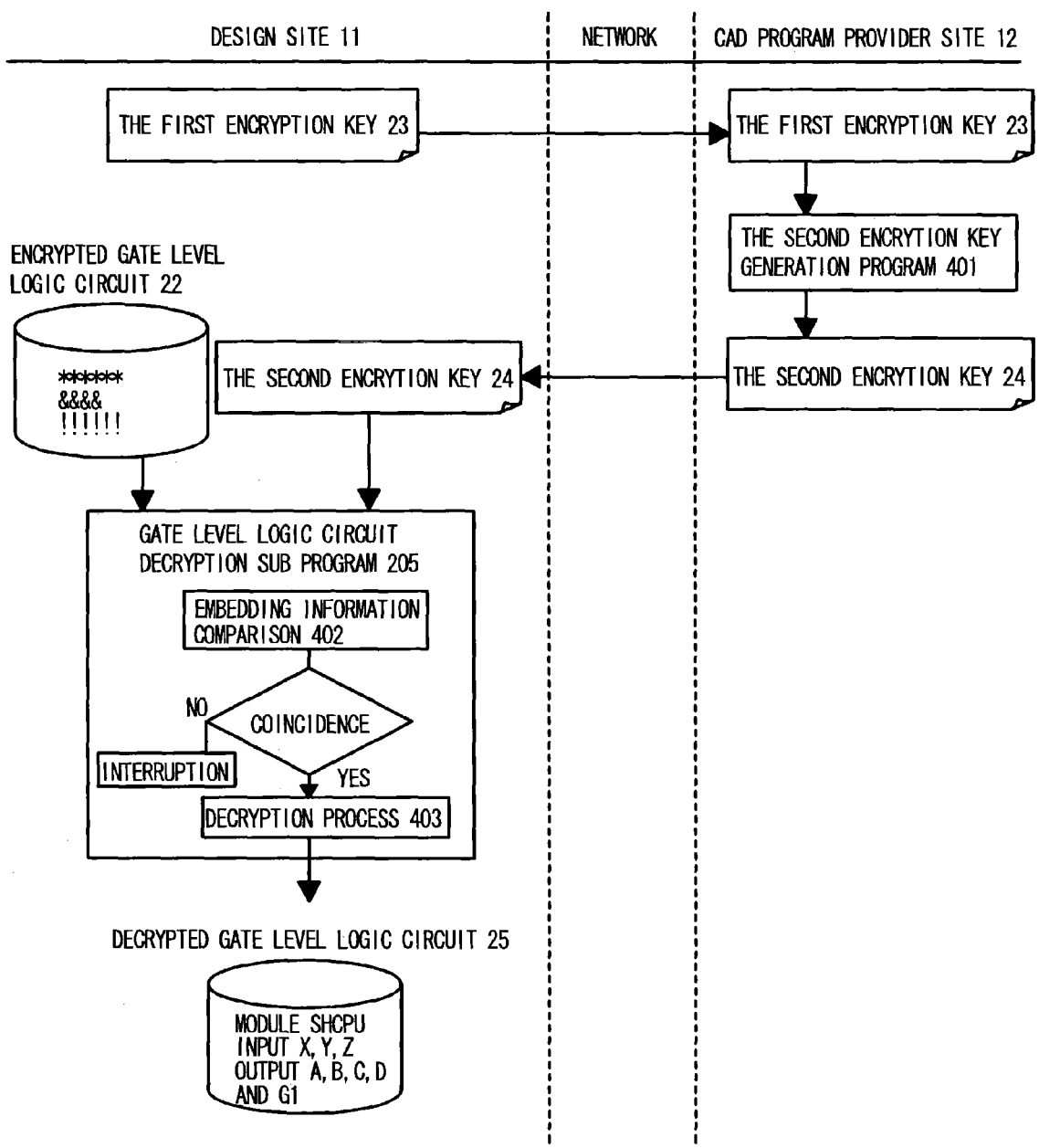
FIG. 4 is a view showing the process of decrypting the gate level logic circuit.

Referring to FIG. 4, the process of decrypting the gate level logic circuit will be described. When the first encryption key 23 is sent from the design site 11 to the CAD program provider site 12, the CAD program provider site creates the second encryption key 24 by using a second encryption key creation program 401 and sends the second encryption key to the design site. In the drawing, user identification and the storage of the use log are not depicted. It is also possible for the CAD program provider site to make a homepage public on the Internet and automatically perform a sequence of processes by using a well known technique. Upon receipt of the second encryption key and the encrypted gate level logic circuit 22, the design site is allowed to obtain the decrypted gate level logic circuit 25 by using the gate level logic circuit decryption sub program 205. The gate level logic circuit decryption sub program compares the design site information and logic circuit information embedded in the encryption key with the information embedded in the encrypted gate level logic circuit (402). If the result of comparison indicates a coincidence, 403 is activated by decryption.

Figure 5:
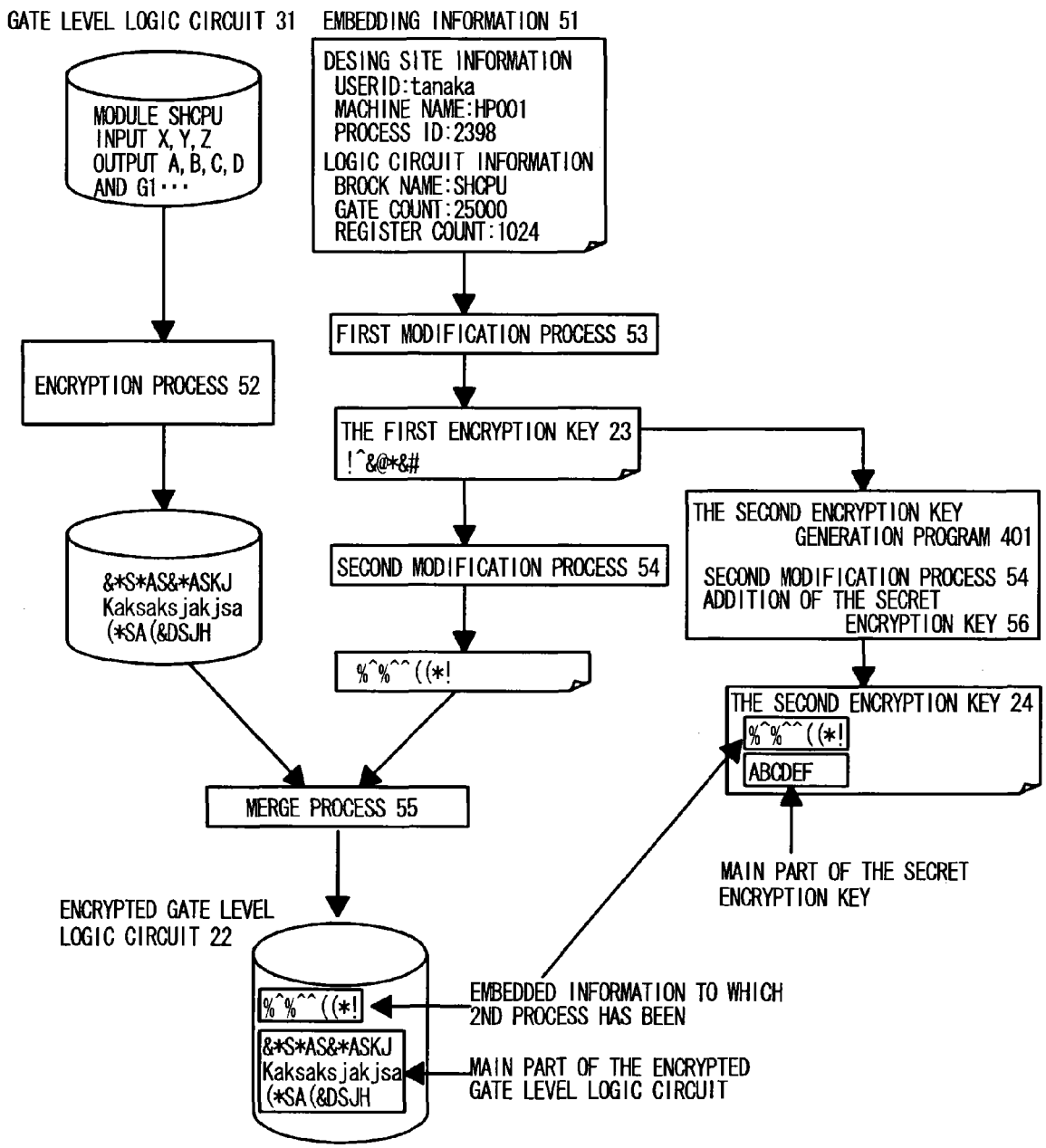
FIG. 5 is a view showing a relationship between the first encryption key and a second encryption key.

Referring to FIG. 5, the first and second encryption keys will be described in detail by way of example. In the present embodiment, the gate level logic circuit 31 is encrypted by an encryption process 52. The first encryption key 23 is generated from design site and logic circuit characteristic embedded information 51 by a first processing process 53. The first encryption key 23 is further processed by a second processing process 54 so that the gate level logic circuit 22 is created by encrypting the embedded information to which the second processing process has been performed in combination with the main part of the gate level logic circuit encrypted by a merge process 55. For the encryption of the gate level logic circuit, DES (Data Encryption Standard) which is a well known technology or the like may be used appropriately. The embedded information is processed to make the design site information and the logic circuit characteristic information unreadable by the user. At the CAD program provider site, the second processing process is performed with respect to the first encryption key (54) and a secret encryption key is added thereto for the decryption of the gate level logic circuit (56) in accordance with the second encryption key creation sub program. The second encryption key 24 is sent to the design site where the CAD program first examines whether or not the second encryption key coincides with the information embedded in the encrypted gate level logic circuit 22 and performs decryption by using the secret encryption key embedded in the second encryption key if there is a coincidence.

FIG. 6 shows the customer management database at the CAD program provider site according to the embodiment. The customer management database 61 stores therein information on the design site as the user including company name and department name, the remaining amount of charged money, information on a designer who can use the CAD program including user ID and password, dates and amounts of money as a history of previously charged fees, information including dates, design data sizes, fees charged at the times of use, and designers who used the CAD program as the previous use log, a discount rate based on the use log, and the like. The management of customers using such a database allows the identification of the user, the presentation of the current remaining amount of money, the presentation of the fee charged this time, the presentation of the remaining amount of money after the payment of the fee charged this time, and the like. Although the present embodiment has adopted a precharge system in which the fee is paid before the use of the CAD program, it is also possible to adopt a system in which the use log is recorded in the database and the fees are paid collectively and simultaneously at the end of the term or at the end of the year. It is also possible to make a payment on a per use basis by automatic electronic banking.

Although the present invention has been described specifically as related to the embodiments, the present invention is not limited to the foregoing embodiments. It will be understood that various modifications may be made without departing from the scope of the invention.

Although an input to the CAD program according to the present invention has been described as a commonest register transfer level or operation level logic circuit, it is also possible for the designer to, e.g., directly describe a gate level logic circuit, and input it such that it is optimized in the CAD program. It is also possible to input a gate level logic circuit that has been synthesized once and optimize circuit characteristics again.

It will easily be appreciated that the configuration of the CAD program according to the present invention is not only applicable to a logic synthesis CAD program for synthesizing agate level logic circuit but also applicable to a CAD program for layout, to a logic synthesis CAD program which receives an operation level logic circuit and generates a register transfer level logic circuit, and to a mechanical design CAD program.

What is claimed is:

1. A method for designing a logic circuit comprising the steps of: describing a register transfer level or operation level logic circuit through transmission and reception of information between a design site and a logic synthesis CAD program provider site; and generating a gate level logic circuit by using a logic synthesis CAD program, said logic synthesis CAD program performing the functions of: receiving said register transfer level or operation level logic circuit and generating said gate level logic circuit; outputting a characteristic of said generated gate level logic circuit as a report; encrypting the generated gate level logic circuit and outputting the encrypted gate level logic circuit; outputting a first encryption key corresponding to said gate level logic circuit; and receiving said encrypted gate level logic circuit and a second encryption key generated from said first encryption key, decrypting said encrypted gate level logic circuit, and outputting said gate level logic circuit, said design site receiving said logic synthesis CAD program at no charge from the logic synthesis CAD program provider site, referring to the circuit characteristic report on a logic circuit which is obtainable at the design site by receiving the register transfer level or operation level logic circuit and using said logic synthesis CAD program, and sending, if the circuit characteristic is as desired, said first encryption key to said logic synthesis CAD program provider site, said logic synthesis CAD program provider site generating a fee charged for the use of said logic synthesis CAD program by said design site based on the first encryption key sent from said designer site and sending, to said design site, said second encryption key obtained by processing said first encryption key, and said design site receiving said encrypted gate level logic circuit and said second encryption key and decrypting said encrypted gate level logic circuit by using said logic synthesis CAD program.

2. The method of claim 1, wherein said circuit characteristic report includes at least one of an area of said corresponding gate level logic circuit, a delay time therein, and power consumption thereof.

3. The method of claim 1, wherein each of said first and second encryption keys contains information intrinsic to said corresponding gate level logic circuit and said second encryption key is usable for decryption of said specified encrypted gate level logic circuit.

4. The method of claim 1, wherein each of said first and second encryption keys contains information intrinsic to said design site and said second encryption key is usable for decryption of said encrypted gate level logic circuit at said specified design site.

5. The method of claim 1, wherein said first encryption key contains information on a size of said gate level logic circuit and said logic synthesis CAD program provider site is allowed to know-the size of said corresponding gate level logic circuit based on said first encryption key sent from said design site and generate the fee charged for the use of said logic synthesis CAD program by the design site in accordance with said size.

6. The method of claim 3, wherein the information intrinsic to said gate level logic circuit includes at least one of a name of said gate level logic circuit, names of input/output ports of said gate level logic circuit, the number of registers contained in said gate level logic circuit, and names of the registers contained in said gate level logic circuit.

7. The method of claim 4, wherein the information intrinsic to said design site includes at least one of a name of a calculator at said design site, a name of an OS program, a version of the OS program, a user account, a date, and a process ID.

8. The method of claim 1, wherein said logic synthesis CAD program provider site presents, to said design site, said fee charged for the use of the logic synthesis CAD program which has been generated based on said first encryption key sent from said design site, receives information on the presence or absence of the intension of said design site to pay the fee, and sends said second encryption key to said design site based on said received information on the presence or absence of the intention to pay the fee.

9. The method of claim 1, wherein said design site collectively prepays a given amount of money to said logic synthesis CAD program provider site for the fee charged for the use of said logic synthesis CAD program and said logic synthesis CAD program provider site manages an amount of usable money remaining after the use of said logic synthesis CAD program by said design site or the remaining number of times the logic synthesis CAD program can be used and subtracts, in sending said second encryption key to said design site, a fee charged for this time of use of said logic synthesis CAD program corresponding to the sending of said second encryption key from said amount of usable remaining money or subtracts this time of use corresponding to the sending of said second encryption key from the remaining number of times the logic synthesis CAD program can be used.

10. The method of claim 1, wherein said design site and said logic synthesis CAD program provider site are connected to each other by a network and transmission and reception of said first and second encryption keys and a process of billing the fee charged for the use of the logic synthesis CAD program based on said first encryption key sent from said design site are performed via said network.

11. A CAD program comprising:

a first sub program for receiving a register transfer level or operation level logic circuit and generating a gate level logic circuit;

a second sub program for outputting a circuit characteristic report on said generated gate level logic circuit;

a third sub program for encrypting said generated gate level logic circuit and outputting the encrypted gate level logic circuit;

a fourth sub program for outputting a first encryption key corresponding to said generated gate level logic circuit; and a fifth sub program for receiving a second encryption key generated based on said first encryption key, decrypting said encrypted gate level logic circuit, and outputting said gate level logic circuit.

12. A CAD program which is a design CAD program for processing input data and generating output data, said CAD program comprising:

a first sub program for generating said output data;

a second sub program for outputting a characteristic report on said generated output data;

a third sub program for encrypting said generated output data and outputting the encrypted output data;

a fourth sub program for outputting a first encryption key corresponding to said generated output data; and a fifth sub program for receiving a second encryption key generated based on said first encryption key, decrypting said encrypted output data, and outputting said output data.

* * * * *